US007883215B2

(12) United States Patent
Chang et al.

(10) Patent No.: US 7,883,215 B2
(45) Date of Patent: Feb. 8, 2011

(54) PROJECTOR AND PROJECTOR CIRCUIT BOARD THEREOF

(75) Inventors: Chin-Tsao Chang, Hsinchu (TW); Lien-Fu Cheng, Hsinchu (TW); I-Hsien Liu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 414 days.

(21) Appl. No.: 12/061,674

(22) Filed: Apr. 3, 2008

(65) Prior Publication Data

US 2009/0046256 A1 Feb. 19, 2009

(30) Foreign Application Priority Data

Aug. 16, 2007 (TW) ............................... 96130295 A

(51) Int. Cl.
*G03B 21/28* (2006.01)
(52) U.S. Cl. ........................................... 353/81; 353/98
(58) Field of Classification Search .................... 353/81, 353/84, 98, 99
See application file for complete search history.

(56) References Cited

U.S. PATENT DOCUMENTS

| 4,680,579 A | 7/1987 | Ott |
| 5,892,473 A | 4/1999 | Shin |
| 6,155,687 A | 12/2000 | Peterson |
| 7,322,702 B2 * | 1/2008 | Shimizu ..................... 353/81 |
| 2006/0139730 A1 | 6/2006 | Oehler et al. |

FOREIGN PATENT DOCUMENTS

| CN | 1655625 | 8/2005 |
| WO | 2007017297 | 2/2007 |

OTHER PUBLICATIONS

English abstract of CN1655625.

* cited by examiner

*Primary Examiner*—Seung C Sohn
(74) *Attorney, Agent, or Firm*—Thomas, Kayden, Horstemeyer & Risley

(57) ABSTRACT

One embodiment of the invention discloses projector circuit boards comprising an image receiving terminal, a central processing unit, a motor driving module, a DMD and a DMD control module. The image receiving terminal receives an image signal and transmits the received image signal to the central processing unit. The central processing unit processes the received image signal. The motor driving module drives a motor on the basis of the processed image signal to rotate a color wheel to generate a colored beam. The DMD, comprising a plurality of micro-mirrors, is used in reflecting the colored beam, transforming the colored beam into an image beam, and transmitting the image beam to a projection lens to project an image. The rotation angles of the micro-mirrors are controlled by the DMD control module coupled between the central processing unit and the DMD. The projector circuit board is perpendicular to a light path of the projection lens.

12 Claims, 5 Drawing Sheets

PROJECTOR AND PROJECTOR CIRCUIT BOARD THEREOF

BACKGROUND OF THE INVENTION

1. Field of the Invention

The present invention relates generally to projector circuit boards, and more particularly, to projectors with projector circuit boards.

2. Description of the Related Art

In conventional techniques, projectors are designed to be a flat object. The conventional projector comprises a first circuit board and a second circuit board. The first circuit board comprises a Digital Micro-mirror Device (DMD) and a DMD control module. The second circuit board comprises a central processing unit. The first and second circuit boards are coupled to each other by bus or connectors.

FIG. 1A illustrates the disposal of the aforementioned first and second circuit boards. Because the DMD 102 arranged on the first board $B_1$ has to be perpendicular to the light path (symbolized by L) of the projection lens 104, the first circuit board $B_1$ is set perpendicular to the light path L. Because conventional projectors are designed to be flat, the space for the first and second circuit boards $B_1$ and $B_2$ are limited and thus the second circuit board $B_2$ has to be perpendicular to the first circuit board $B_1$ (as that shown in FIG. 1A) to improve space utilization. The first and second circuit boards $B_1$ and $B_2$ communicate with each other by bus or connectors.

FIG. 1B illustrates the disassembled first and second circuit boards. $B_1'$ and $B_2'$ represent $B_1$ and $B_2$ of FIG. 1A, respectively. Component 106 is a connector plug on the first circuit board, and its corresponding connector port symbolized by 108 is arranged on the second circuit board $B_2'$.

Because the first and second circuit boards $B_1$ and $B_2$ communicate with each other via bus or connectors, the conventional projector may malfunction or project inferior images due to poor contact. Moreover, size deviation caused during fabrication exists between different Printed Circuit Boards (PCBs). When the size deviation between the first and second circuit boards $B_1$ and $B_2$ exceeds a tolerable value, the connection between the two circuit boards $B_1$ and $B_2$ may be poor (broken circuit or short), and thus the projector would not work normally.

The transmission speed of electronic signals has increased with the development of semiconductor technology. To communicate at high speeds, the connectors or bus connecting the first and second circuit boards should be produced by relatively superior quality materials. Thus, the cost of the projector would increase. Moreover, high transmission speed aggravates the Electromagnetic Interface (EMI) between the bus and connectors.

Novel projector circuit boards without the aforementioned drawbacks are called for.

BRIEF SUMMARY OF THE INVENTION

An embodiment of the invention discloses a projector circuit board comprising an image receiving terminal, a central processing unit, a motor driving module, a Digital Micro-mirror Device (DMD) and a DMD control module. The above mentioned components may be produced by high-level semiconductor processes. The image receiving terminal receives an image signal and transmits the received image signal to the central processing unit. The central processing unit processes the received image signal. The motor driving module drives a motor on the basis of the processed image signal to rotate a color wheel to generate a colored beam. The DMD, comprising a plurality of micro-mirrors, is used in reflecting the colored beam, transforming the colored beam into an image beam, and transmitting the image beam to a projection lens to project an image. The rotation angles of the micro-mirrors are controlled by the DMD control module coupled between the central processing unit and the DMD. The projector circuit board is perpendicular to a light path of the projection lens.

In other embodiments of the invention, the projectors comprise the aforementioned projector circuit boards. The projector comprises a light source, a color wheel, a motor, a reflection mirror, a projection lens and the aforementioned projector circuit board. The light source provides a light beam. The color wheel rotated by the motor transforms the light beam into a colored beam. The colored beam is reflected to the DMD of the projector circuit board by the reflection mirror. In addition to reflecting the colored beam, the DMD also modulates the colored beam into an image beam and transmits the image beam to the projection lens to project an image. The projector circuit board is perpendicular to a light path of the projection lens.

The above and other advantages will become more apparent with reference to the following description taken in conjunction with the accompanying drawings. Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having"

and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
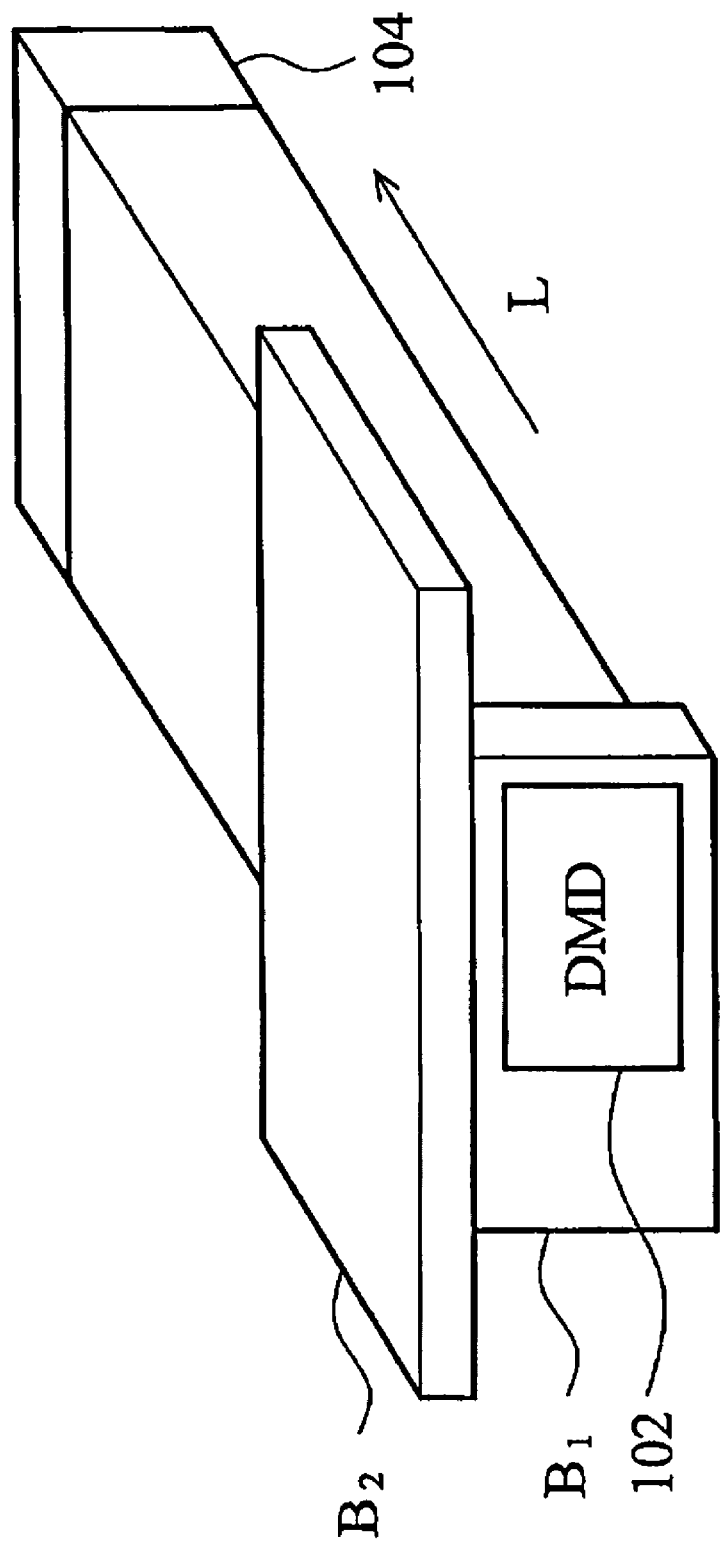
FIG. 1A illustrates the disposal of the first and second circuit boards of conventional projectors.
Figure 1B:
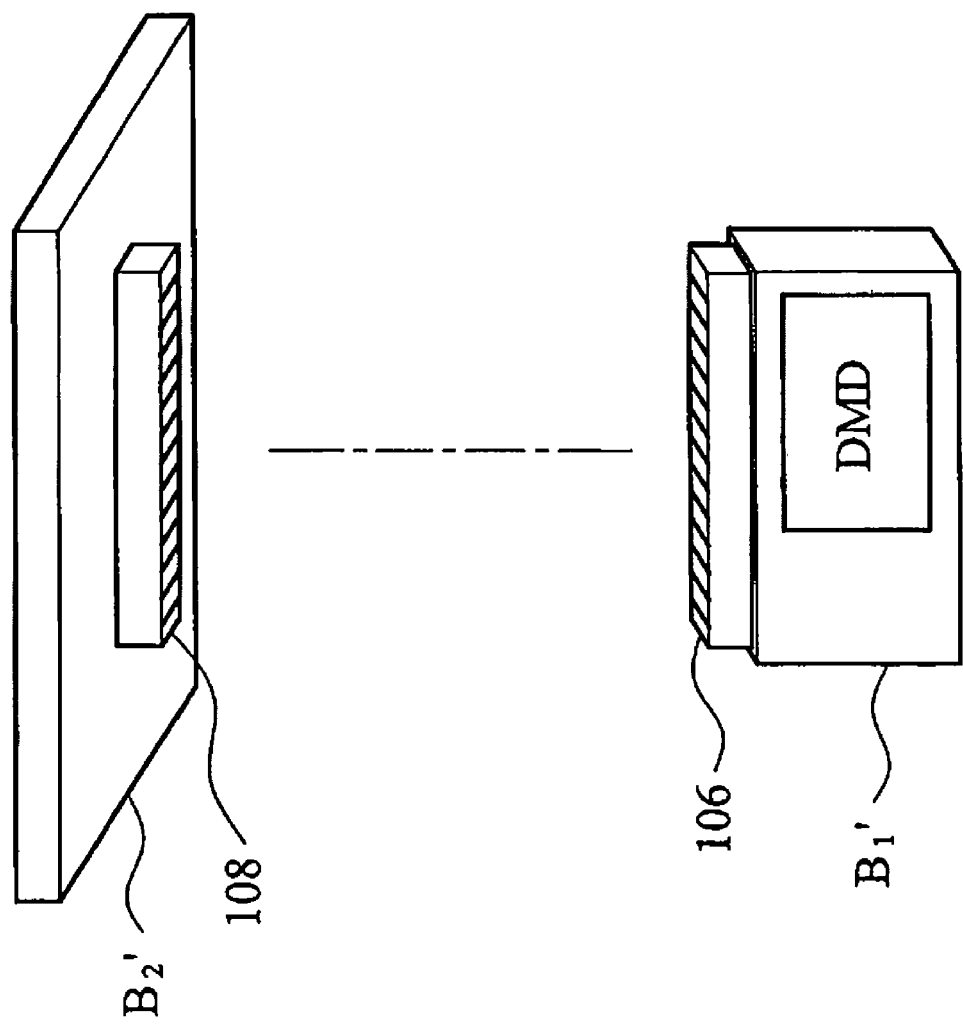
FIG. 1B illustrates the disassembled first and second circuit boards of conventional projectors.
Figure 2:
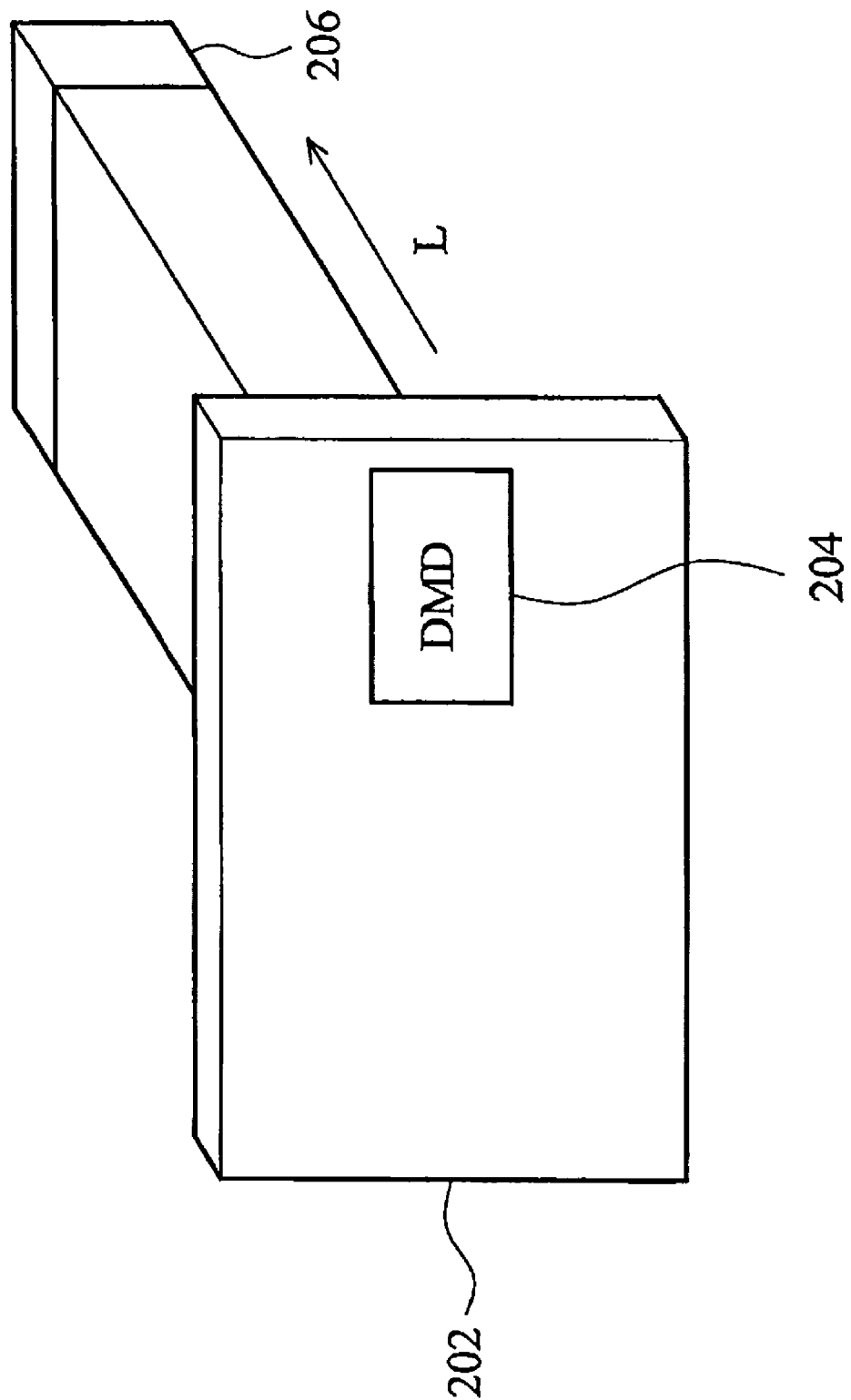
FIG. 2 illustrates the disposal of a projection lens and a projector circuit board according to an embodiment of the invention.

FIG. 2 illustrates the disposal of a projection lens and a projector circuit board of one embodiment of the invention. Comparing FIG. 1A with FIG. 2, the convention projector comprises a first and a second circuit board $B_1$ and $B_2$, but one embodiment of the invention integrates the components of $B_1$ and $B_2$ on a single projector circuit board 202. Components in the projector circuit board 202 are produced by high-level semiconductor processes (having lower channel width to length ratios W/L compared to the low-level semiconductor processes). Thus the size of the projector circuit board 202 is dramatically reduced and can be installed in the limited space of the projector. To allow the DMD 204 to successfully transmit light to the projection lens 206, the DMD 204 has to be perpendicular to a light path L of the projection lens 206 (as that shown in FIG. 2). Thus, the projector circuit board 202 is perpendicular to the light path L.

Figure 3:
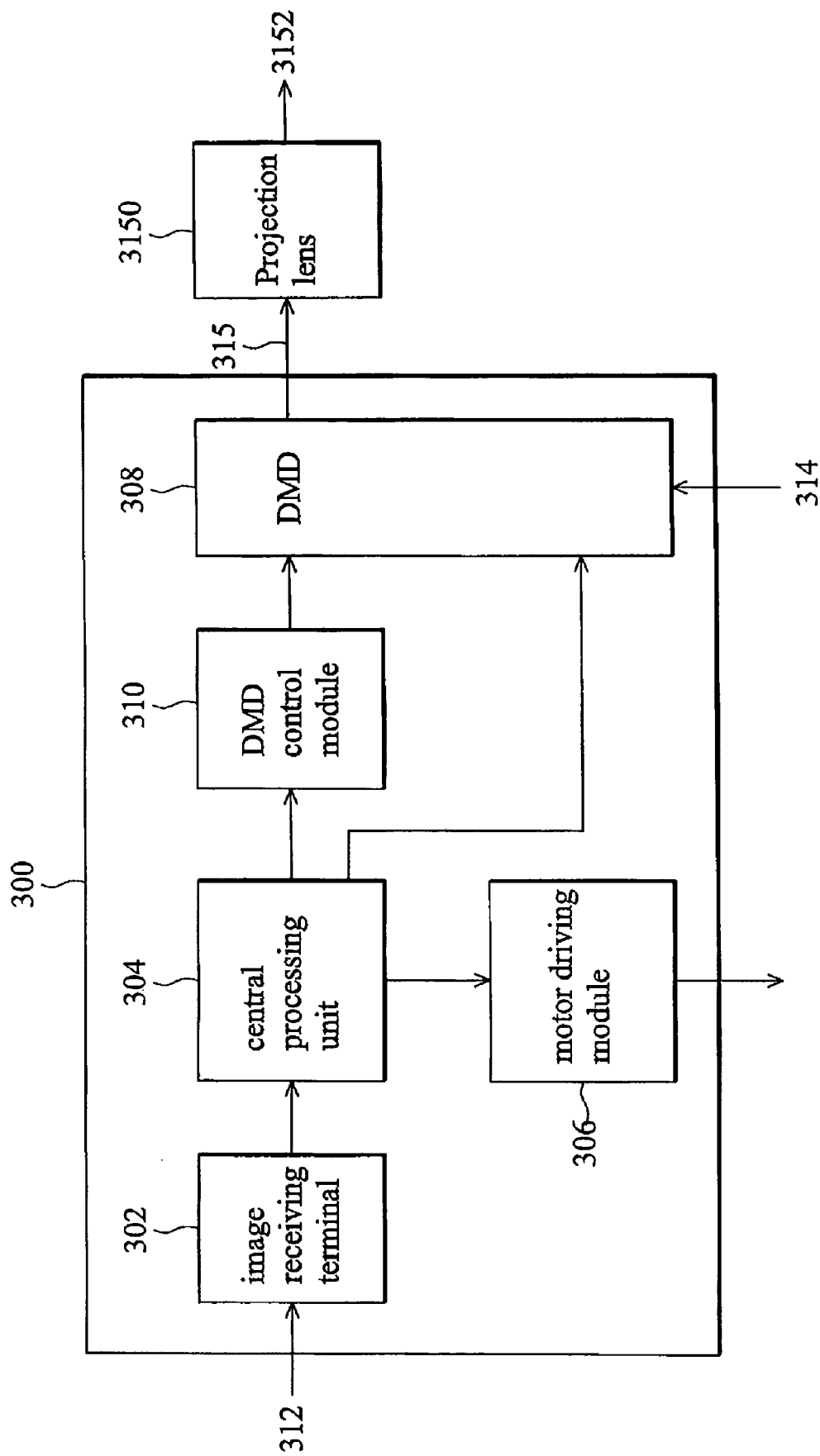
FIG. 3 is a block diagram showing the projector circuit board according to an embodiment of the invention.

FIG. 3 is a block diagram showing a projector circuit board according to an embodiment of the invention. The projector circuit board 300 comprises an image receiving terminal 302, a central processing unit 304, a motor driving module 306, a DMD 308 and a DMD control module 310. The components of the projector circuit board 300 are produced by high-level semiconductor processes, and thus the size of the projector circuit board 300 is much smaller than the first and second circuit boards $B_1$ and $B_2$ shown in FIG. 1A. The image receiving terminal 302 receives an image signal 312 and transmits the received image signal to the central processing unit 304. The central processing unit 304 processes the received image signal and then sends the processed image signal to the motor driving module 306. On the basis of the processed image signal, the motor driving module 306 drives a motor (outside the projector circuit board and not shown in FIG. 3) to rotate a color wheel (outside the projector circuit board and not shown in FIG. 3) to generate a colored beam 314. The DMD 308 reflects the colored beam 314, modulates the colored beam 314 into an image beam 315 according to the outputs of the central processing unit 304 (the output of the central processing unit 304 is related to the image signal 312), and transmits the image beam 315 to a projection lens 3150 to project an image 3152. The DMD 308 comprises a plurality of micro-mirrors (not shown in FIG. 3) whose rotation angles are controlled by the DMD control module 310 coupled between the central processing unit 304 and the DMD 308.

Figure 4:
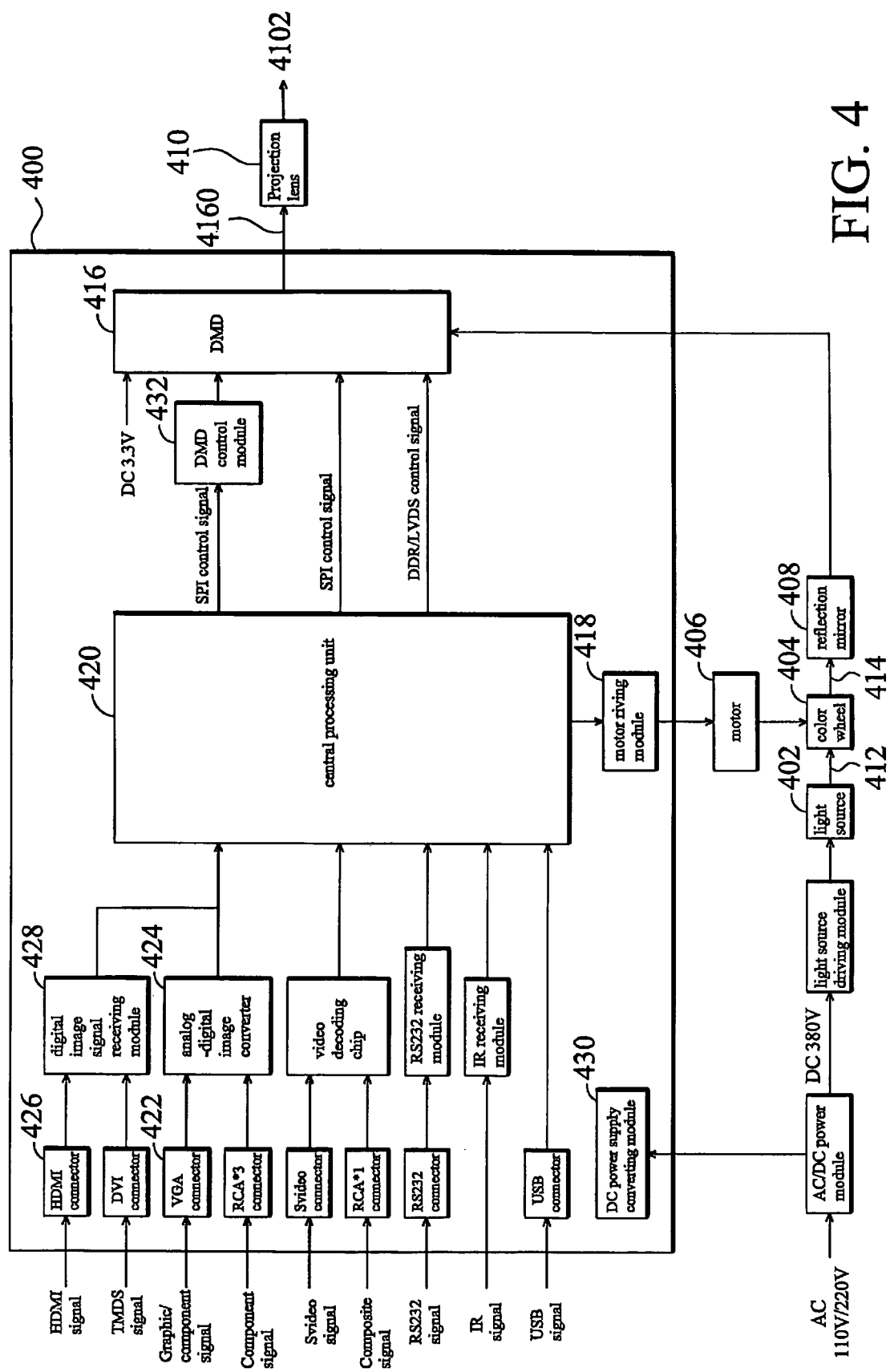
FIG. 4 illustrates the projector according to an embodiment of the invention.

FIG. 4 illustrates a projector according an embodiment of the invention, which adopts the projector circuit board (symbolized by 400) of an embodiment of the invention. Referring to FIG. 4, in addition to the projector circuit board 400, the projector further comprises a light source 402, a color wheel 404, a motor 406, a reflection mirror 408 and a projection lens 410. The light source 402 provides a light beam 412. The motor 406 is controlled by a motor driving module 418 of the projector circuit board 400 and is used in rotating the color wheel 404. The light beam 412 is filtered and transformed into a colored beam 414 by the color wheel 404. The reflection mirror 408 adjusts the path of the colored beam 414. The colored beam 414 is reflected by the reflection mirror 408 and received by the DMD 416 of the projector circuit board 400. The DMD 416 reflects the received colored beam, generates an image beam 4160 based on the received image signal, and transmits the image beam 4160 to the projection lens 410 to project an image 4102. The projector circuit board 400 is posed as that shown in FIG. 2, being perpendicular to the light path L of the projection lens 410.

In the embodiment shown in FIG. 4, the projector circuit board 400 receives a variety of image signals, including High-Definition Multimedia Interface (HDMI) signal, Transition-Minimized Differential Signaling (TMDS) signal, Graphic/component signal, Component signal, SVideo signal, Composite signal, Recommended Standard 232 (RS232) signal, Infrared Radiation (IR) signal and Universal Serial Bus (USB) signal. The corresponding image connectors are HDMI connector, Digital Visual Interface DVI connector, Video Graphics Array (VGA) connector, Radio Corporation of America (RGA)*3 connector, S-Video connector, RCA*1 connector, RS232 connector, USB connector and so on. In some embodiments, the received image signal is sent to the central processing unit 420 after an appropriate image processing. For example, when the received image signal is a Graphic/component signal, the VGA connector 422 sends the received Graphic/component signal to an analog-digital image converter 424 coupled between the VGA connector 422 and the central processing unit 420. The Graphic/component signal is converted from an analog form into a digital form by the analog-digital image converter 424 and then is sent to the central processing unit 420. When the image signal is a HDMI signal, the HDMI connector 426 sends the received HDMI signal to a digital signal receiving module 428 coupled between the HDMI connector 426 and the central processing unit 420. The digital signal receiving module 428 converts the HDMI signal into a specific signal format capable of being processed by the central processing unit 420, and sends the converted HDMI signal to the central processing unit 420.

The central processing unit 420 is used to process the received image signal. The motor driving module 418 drives the motor 406 on the basis of the processed image signal. The central processing unit 420 further drives the DMD control module 432 to control the rotation angle of the micro-mirrors (not shown in FIG. 4) of the DMD 416.

Referring to FIG. 4, the projector circuit board 400 further comprises a direct current (DC) power supply converting module 430 generating a plurality of voltage levels for different components of the projector circuit board 400.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector circuit board, comprising:
an image receiving terminal, receiving an image signal;
a central processing unit, processing the received image signal;
a motor driving module, rotating a color wheel on the basis of the processed image signal to generate a colored beam;
a Digital Micro-mirror Device, comprising a plurality of micro-mirrors, reflecting the colored beam, modulating the colored beam into an image beam on the basis of the image signal, and transmitting the image beam to a projection lens to project an image; and
a Digital Micro-mirror Device control module, coupling to the central processing unit and the Digital Micro-mirror Device, and controlling rotation angles of the micro-mirrors on the basis of the image signal;
wherein the projector circuit board is perpendicular to a light path of the projection lens.

2. The projector circuit board as claimed in claim 1, further comprising a direct current power supply converting module generating a plurality of voltage levels for different components of the projector circuit board.

3. The projector circuit board as claimed in claim 1, wherein the image receiving terminal is implemented by a Video Graphics Array connector.

4. The projector circuit board as claimed in claim 3, further comprising an analog-digital image converter coupling to the Video Graphics Array connector and the central processing unit to convert the image signal received by the Video Graphics Array connector from an analog form to a digital form.

5. The projector circuit board as claimed in claim 1, wherein the image receiving terminal is implemented by a High-Definition Multimedia Interface connector.

6. The projector circuit board as claimed in claim 5, further comprising a digital image signal receiving module coupling to the High-Definition Multimedia Interface connector and the central processing unit to convert the image signal received by the High-Definition Multimedia Interface connector to a specific signal format capable of being processed by the central processing unit.

7. A projector, comprising:
a light source, providing a light beam;
a motor;
a color wheel, rotated by the motor to transform the light beam to a colored beam;
a projection lens; and
a projector circuit board, comprising:
an image receiving terminal, receiving an image signal;
a central processing unit, processing the image signal received by the image receiving terminal;
a motor driving module, driving the motor on the basis of the processed image signal;
a Digital Micro-mirror Device, comprising a plurality of micro-mirrors, reflecting the colored beam, modulating the colored beam into an image beam on the basis of the image signal, and transmitting the image beam to the projection lens to project an image; and
a Digital Micro-mirror Device control module, coupling to the central processing unit and the Digital Micro-mirror Device, and controlling rotation angles of the micro-mirrors;
wherein the projector circuit board is perpendicular to a light path of the projection lens.

8. The projector as claimed in claim 7, further comprising a direct current power supply converting module generating a plurality of voltage levels for different components of the projector circuit board.

9. The projector as claimed in claim 7, wherein the image receiving terminal is implemented by a Video Graphics Array connector.

10. The projector as claimed in claim 9, further comprising an analog-digital image converter coupling to the Video Graphics Array connector and the central processing unit to convert the image signal received by the Video Graphics Array connector from an analog form to a digital form.

11. The projector as claimed in claim 7, wherein the image receiving terminal is implemented by a High-Definition Multimedia Interface connector.

12. The projector as claimed in claim 11, further comprising a digital image signal receiving module coupling to the High-Definition Multimedia Interface connector and the central processing unit to convert the image signal received by the High-Definition Multimedia Interface connector to a specific signal format that capable of being processed by the central processing unit.

* * * * *